United States Patent Office 2,934,041
Patented Apr. 26, 1960

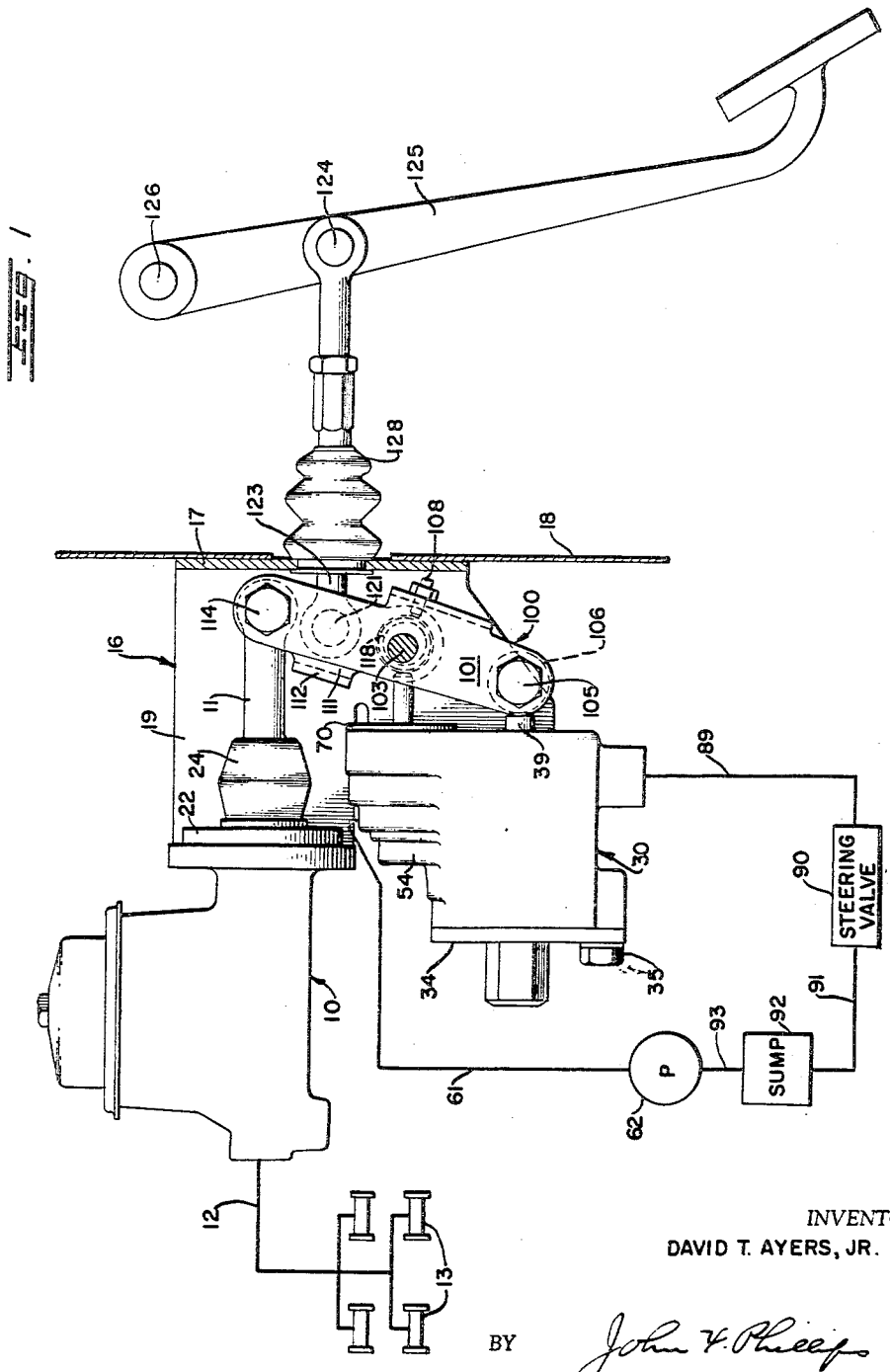

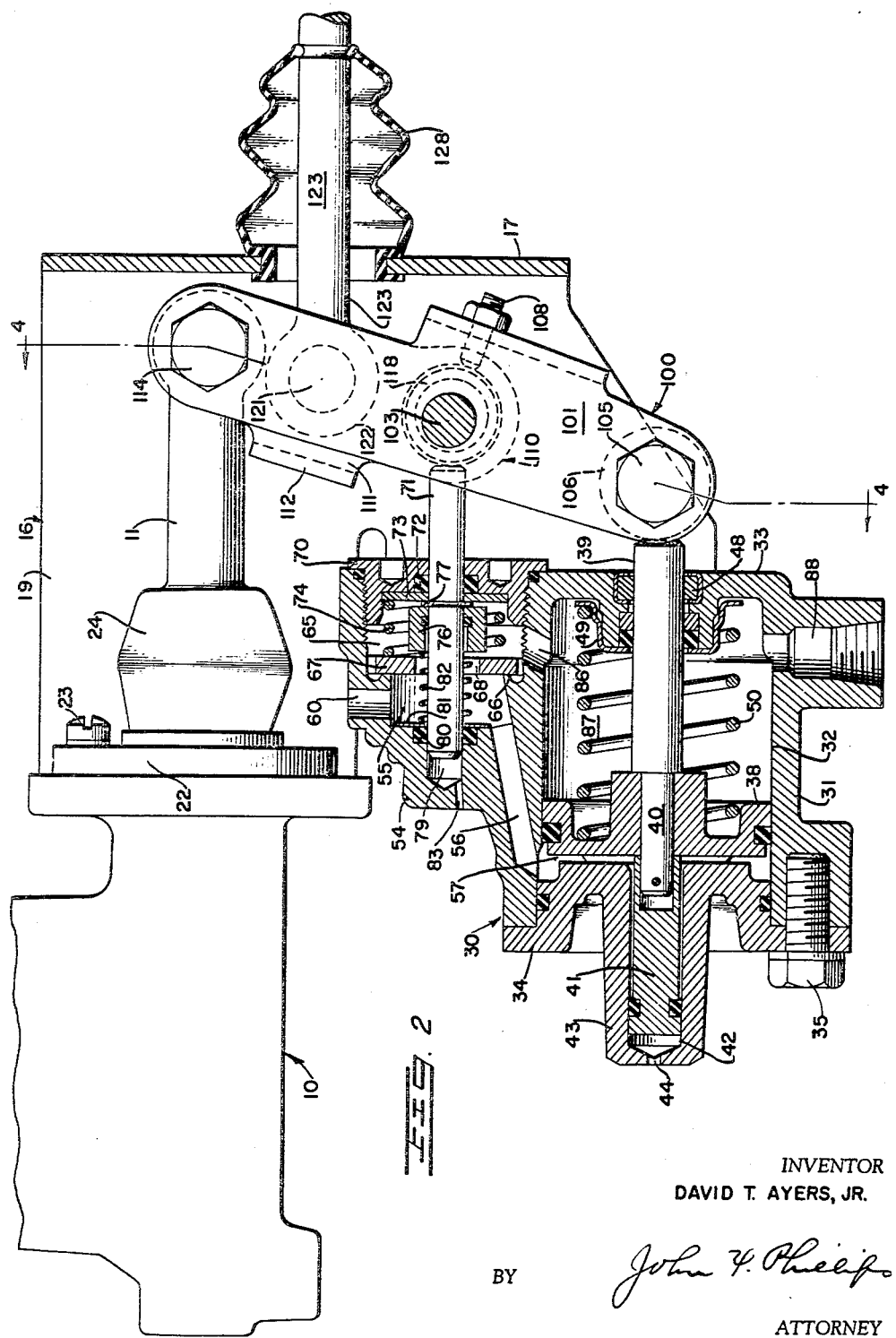

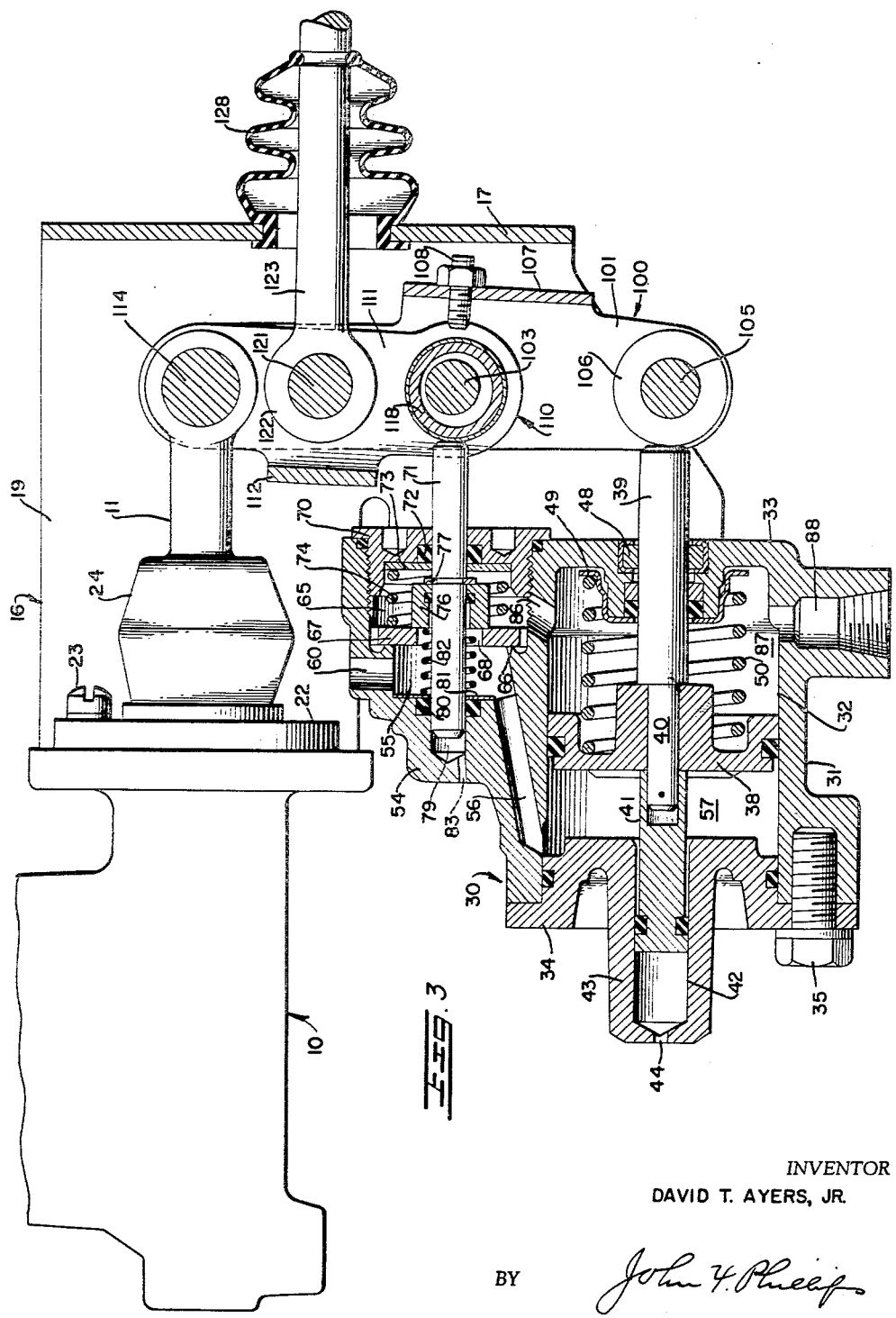

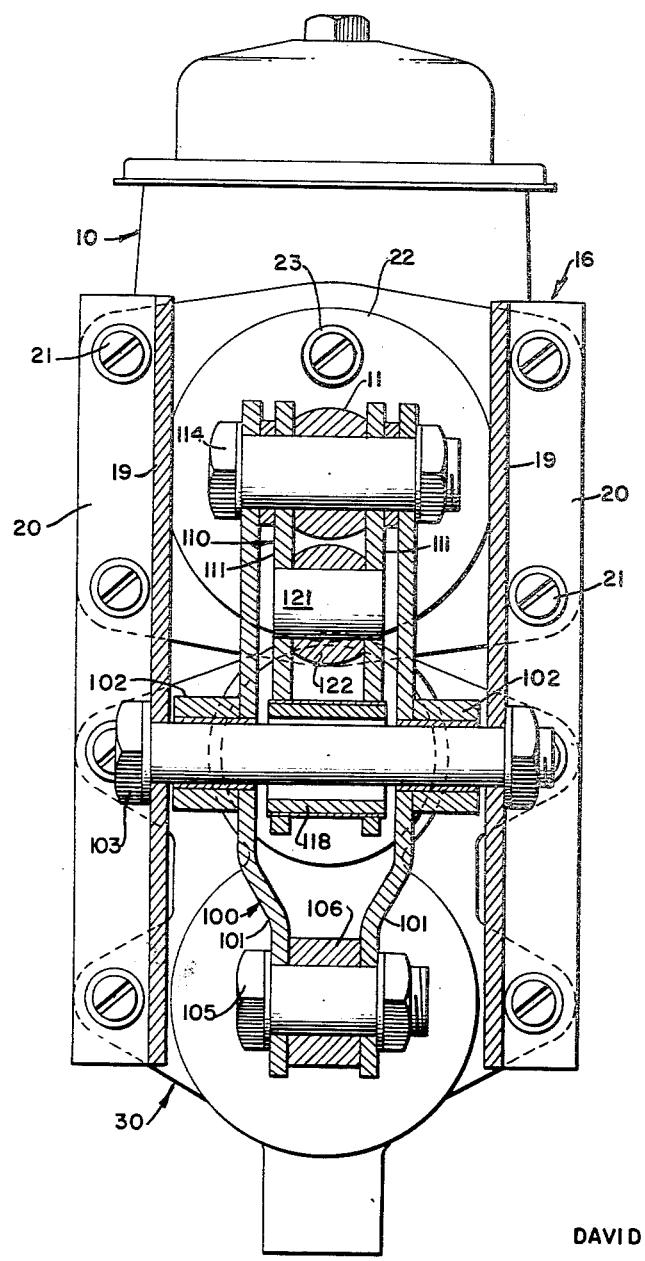

2,934,041

BOOSTER MECHANISM

David T. Ayers, Jr., Birmingham, Mich., assignor to Kelsey-Hayes Company, Detroit, Mich., a corporation of Delaware Application June 24, 1957, Serial No. 667,385

12 Claims. (Cl. 121—41)

This invention relates to a booster mechanism, and particularly to such a mechanism wherein the booster motor is hydraulically operated by fluid normally flowing in an open circuit such as is used in conjunction with a power steering mechanism for motor vehicles. The invention embodies certain features shown in the copending application of William Stelzer and David T. Ayers, Jr., Serial No. 664,134, filed June 6, 1957.

An important object of the invention is to provide a novel highly compacted and simplified booster mechanism particularly for vehicle brake systems wherein the entire mechanism, except for the brake pedal, may be pre-assembled and installed as a unit in the motor vehicle and wherein the mechanism is particularly adapted for use with a low brake pedal having limited travel.

A further object is to provide such a mechanism wherein the motor and the valve mechanism therefor are highly simplified and embody a minimum number of working parts all of which are capable of easy assembly.

A further object is to provide a mechanism of this character wherein a soft initial pedal is provided and wherein two stages of direct hydraulic reaction are transmitted to the brake pedal while employing a mechanism having a minimum number of parts, as stated.

A further object is to embody in such simplified construction features which adapt the mechanism for use in connection with an open hydraulic system used for the operation of a power steering mechanism and wherein the booster mechanism is unaffected by increases in pressure in the system between the pump and steering valve incident to operation of the steering valve, thus preventing any operation of the booster motor when the steering wheel is turned to operate the steering valve.

A further object is to provide a novel type of motor employed in conjunction with a lever mechanism having mechanical connection with the valve mechanism, with the master cylinder and with the brake pedal, and wherein forces applied to the brake pedal may be directly utilized for operating the master cylinder, upon a failure of power in the pressure source, without having to transmit movement to any of the motor parts.

A further object is to provide a novel hydraulic motor and valve mechanism having a common body or housing and utilizing simple heads on the motor and valve mechanism to facilitate the assembling of the parts of the apparatus.

Other objects and advantages of the invention will become apparent during the course of the following description.

In the drawings I have shown one embodiment of the invention. In this showing:

Figure 1 is a side elevation of the apparatus, a portion of the supporting bracket and the fire wall of the vehicle being shown in section and parts of the braking and circulating system being diagrammatically illustrated;

Figure 2 is an enlarged fragmentary sectional view through the motor and valve mechanism and associated elements, parts being shown in elevation, all of the elements being shown in normal off positions;

Figure 3 is a similar view except that the section extends through the lever mechanism, the parts being shown in positions they will occupy at a given point during operation of the brake mechanism; and Figure 4 is a section on line 4—4 of Figure 2.

Referring to Figure 1, the numeral 10 designates a conventional master cylinder, corresponding to the type of master cylinder employed in pedal operated braking systems. The master cylinder is provided therein with a fluid displacing plunger (not shown) operable by a push rod 11. Upon operation of such rod, fluid will be displaced from the master cylinder through lines 12 for distribution to conventional wheel cylinders 13.

The master cylinder 10 and other elements of the apparatus are adapted to be supported by a bracket indicated as a whole by the numeral 16. This bracket is substantially U-shaped in plan and includes a transverse vertical wall 17 secured in any suitable manner to the fire wall 18 of the motor vehicle (Figure 1). The bracket 16 further includes forwardly extending side walls 19 (Figure 4) the forward extremities of which are turned outwardly to form flanges 20 to which the master cylinder 10 is secured by screws or other fastening elements 21. The rear end of the master cylinder is closed by a head 22 secured to the master cylinder by screws 23. A sealing boot 24 is connected between the head 22 and push rod 11.

A motor mechanism indicated as a whole by the numeral 30 is arranged beneath the master cylinder 10 and push rod 11 between the walls 19 of the bracket. The motor mechanism comprises a cylinder 31 having a bore 32 therein closed at its rear end by a preferably integral head 33. The opposite end of the bore 32 is closed by a removable head 34 fixed in position by screws or the like 35.

A piston 38 is slidable in the bore 32 in sealed relation thereto and is connected to a rearwardly extending piston rod 39. This piston rod has a reduced end 40 extending through the piston 38 and connected at its forward end to a pressure balancing rod 41, the forward end of which is slidable in sealed relation in a bore 42 formed in an axial projection 43 made integral with the cylinder head 34. The forward end of the bore 43 is vented to the atmosphere as at 44.

The piston rod 39 is slidable through suitable bearing and sealing means indicated as a whole by the numeral 48, carried by the cylinder head 33. A spring seat 49 surrounds the central inwardly projecting portion of the head 33, and a return spring 50 engages at opposite ends against the piston 38 and seat 49 to bias the piston 38 to its normal position shown in Figure 2.

The motor mechanism includes a valve housing 54 formed integral with the cylinder 31 and provided therein with a chamber 55 communicating through a passage 56 with a pressure chamber 57 formed in the motor between the piston 38 and head 34. The chamber 55 communicates through a port 60 with a line 61 connected to the outlet side of a pump 62 which constantly circulates hydraulic fluid through the system in a manner described below.

The valve housing 54 is provided with a second hydraulic chamber 65, coaxial with and larger than the chamber 55, and these two chambers have formed therebetween a valve seat 66 engaged by a combined valve and seat member 67, in the form of a disk arranged in the chamber 65. The member 67 is provided with an axial opening 68 therethrough for the normal communication of the chambers 55 and 65 with each other, as further described below.

The rear end of the chamber 65 is closed by a plug 70 threaded in the valve body 54. A stem 71 is slidable through the plug 70 and is surrounded by a seal 72 maintained in position by a washer 73 acting as a seat for the rear end of a spring 74, the forward end of which engages the member 67 to normally maintain the latter on the seat 66 with a predetermined force.

A cup-shaped valve 76 surrounds the stem 71 and is fixed against longitudinal movement thereof in one direction by a snap ring 77 carried by the stem 71. The forward end of the stem 71 slides in a bore 79 formed in the valve housing 54, the bore 79 being sealed relative to the stem 71 as at 80. The seal 80 is maintained in position by a washer 81 forming a seat engageable with the forward end of a spring 82, and the rear end of this spring engages the valve 76 to bias it to its normal position shown in Figure 2 with the snap ring 77 engaging the washer 73. The bore 79 is vented to the atmosphere as at 83.

With the valve 76 in its normal off position shown in Figure 2, the chambers 55 and 65 communicate with each other through port 68. Accordingly hydraulic fluid from the pump constantly flows into the chamber 65 from which it is discharged through a port 86 into a low pressure chamber 87 formed between the piston 38 and head 33. Fluid flowing into the chamber 87 is discharged therefrom through a port 88, and such fluid flows through a line 89 (Figure 1) thence through a conventional steering valve 90, line 91 and sump 92, and then back to the intake side of the pump 62 through a line 93. Normally, therefore, there is a constant circulation of fluid through the open system described. The steering valve 90 is of the open center type, as is well known, thus providing for the constant flow of fluid through the fluid circuit.

Between the bracket walls 19 is arranged a lever indicated as a whole by the numeral 100 and comprising spaced arms 101 to the outer faces of which, intermediate the ends of the lever 100, are welded or otherwise secured axially alined sleeves 102. A heavy pivot pin 103 extends through the sleeves 102 and through the bracket arms 19 to support the lever 100 for turning movement on a fixed axis. The lower ends of the lever arms 101 are provided with a bolt 105 extending therethrough and supporting therebetween a roller 106. This roller engages the projecting end of the piston rod 39 so that movement of such rod to the right in Figures 2 and 3 transmits movement to the lever 100 to turn it about its fixed pivot pin 103.

The lever arms 101 are connected by a preferably integral cross member 107 (Figure 3) to brace the lever arms 101 relative to each other and to carry an adjusting screw 108 for a purpose to be described. A second lever indicated as a whole by the numeral 110, and comprising parallel arms 111, is arranged between the lever arms 101, and the lever arms 111 are connected and braced with respect to each other by a preferably integral cross member 112 (Figure 3). The upper ends of the lever arms 111 are arranged between the upper ends of the lever arms 101, and a pivot pin 114 extends through all four of the lever arms as shown in Figure 4. The rear end of the push rod 11 is mounted between the upper ends of the lever arms 111 and surrounds the pivot pin 114, and thus the push rod 11 is pivotally connected to the upper ends of both the levers 100 and 110.

At their lower ends, the lever arms 111 are provided with a sleeve 118 as shown in Figure 4, such sleeve being of larger diameter than and surrounding the fixed pivot pin 103. Accordingly, it will be apparent that the lever 110 is adapted to swing about the pivot pin 114 to a limited extent, independently of the pivot pin 103. The sleeve 118 engages the rear end of the valve operating stem 71. The screw 108 is adapted to engage the sleeve 118 in the normal positions of the parts to limit rearward swinging movement of the lower end of the lever 110.

Between the pivot pins 103 and 114 (Figure 4) the lever arms 111 are connected by a pin 121 to pivotally connect to the lever 110 the rear end 122 of an operating rod 123. The rear end of this rod is pivotally connected as at 124 to the conventional brake pedal 125, preferably of the depending type, pivotally supported at its upper end as at 126. A conventional sealing boot 128 is preferably connected between the bracket wall 17 and the operating rod 123.

*Operation*

With the parts in the positions shown in Figures 1 and 2, there will be a constant circulation of fluid through pipe 61, into and through chambers 55, 65 and 87, through pipe 89, steering valve 90 and line 91, back to the sump 92, which constantly supplies fluid through line 93 to the pump 62. Assuming that the steering valve 90 is not being operated, the flow of hydraulic fluid will be free and no appreciable pressure will exist in the system except as may be caused by negligible line resistance, etc. Assuming that the steering valve is operated with the brake remaining in normal position, there will be a build-up in pressure in the line 89 and consequently in the chambers 55, 65 and 87 and in the line 61 leading from the outlet side of the pump. There will be a corresponding increase in pressure in the motor chamber 57, through passage 56. In the absence of the stem 41, such increase in pressure in the motor chambers 57 and 87, while taking place to the same extent, would result in movement of the piston 38 toward the right in Figures 2 and 3. This would be due to the greater area of the piston 38 exposed to the chamber 57 than to the chamber 87, because of the area of the piston 38 taken up by the stem 39. This stem, however, in the present case is equal to the diameter of the bore 42. Hence the stem 41 balances off an area of the piston 38 equal to the area of the stem 39. Any equal pressures existing in the motor chambers, therefore, regardless of such pressures, will have no tendency to move the piston 38.

Similarly, the valve stem 71 decreases to exactly the same extent the area of the valve 76 open to pressures in the chambers 55 and 65, when the parts are in the normal position shown in Figure 2. Any back pressures, therefore, occurring incident to operation of the steering valve will not tend to move the valve 76 and the latter will be retained in its off position by its biasing spring 82.

The brake mechanism is operated by depressing the brake pedal 125, thus transmitting movement through the operating rod 123 to the pin 121 to swing the lower end of the lever 110 to the left of the position shown in Figure 2. This operation moves the valve 76 into proximity to the port 68, thus throttling the flow of liquid from the chamber 55 to the chamber 65. This causes an immediate build-up in pressure in the chamber 55 and consequently in the motor chamber 57, and the piston 38 will move to the right from the position shown in Figure 2 to the position, for example, shown in Figure 3. When the motor piston so moves, it transmits force through the piston rod 39 to the roller 106 to move the lower end of the lever 100 to the right. This lever, turning about the fixed pivot pin 103, will transmit force from the upper pivot pin 114 to the master cylinder push rod 11, thus displacing fluid into the brake lines 12 and to the wheel cylinders 13. This force will be added to by the force transmitted to the pivot pin 121 by operation of the brake pedal. In this connection, it is pointed out that forces applied to the pivot pin 121 will be transmitted partly to the pivot pin 114 and partly to the valve operating stem 71. When movement of the stem 71 throttles the port 68, the increased pressure in the chamber 55 occurring in the manner described acts against the valve 76, thus transmitting a direct hydraulic reaction through the stem 71 to the sleeve 118, and thus through the lever 110 to the operating rod 123.

The operation just described provides the initial stage of hydraulic reaction against the brake pedal and takes place without the actual closing of the valve 76. As pressure against the brake pedal is increased, greater force will be transmitted through the stem 71 to the valve 76, tending to move this valve closer to its seat formed by the member 67, thus further increasing pressure in the chamber 55. When such pressure increases to the degree necessary for such purpose, the member 67 will move slightly off its seat 66 against the loading of the spring 74, the member 67 now engaging the valve 76. Thus a substantially greater pressure responsive area will be subjected to pressure in the chamber 55, namely, the exposed areas of the valve 76 and member 67, and accordingly in later stages of booster operation, a secondary or higher stage of hydraulic reaction will be transmitted to the brake pedal, as is desirable.

In the event the steering mechanism is operated while the brakes are in operation, a back pressure will be created in the chambers 87 and 65, thus tending to seat the member 67. This results in an immediate increase in pressure in the chamber 55 and consequently in the motor chamber 57, and pressure in the latter chamber will increase to the extent necessary to overcome pressure in the chamber 87 in accordance with the force being transmitted to the brake pedal. In other words, the net booster motor operating pressure available under such conditions will automatically adjust itself to the same differential motor chamber pressures that would be present if the steering valve were not operated.

In the event of a failure of power for operating the booster motor, the brakes may be operated directly by pedal pressure. Under such conditions, force transmitted by the pedal through the rod 123 will swing the lever 110 to the limit of movement permitted by the valve elements 76 and 67. The lever 110 thus can swing no further to the left at its lower end, and continued application of force to the brake pedal will cause the levers 100 and 110 to swing as a unit to apply force to the master cylinder push rod 11. The limiting of the movement of the sleeve 118 may be provided for by the valve elements 76 and 67 in the manner stated, while the play between the sleeve 118 and pin 103 may be so designed that these elements will be brought into engagement to take up the necessary thrust transmitted through the operating rod 123.

It will be apparent that when a manual application of the brakes takes place under the conditions stated, the swinging of the lever 100 about the pivot pin 103 will move the roller 106 away from the piston rod 39, the piston 38 and the parts connected thereto remaining in their normal off positions. The operator therefore is not called upon to perform a pedal operation of the master cylinder against the friction of the piston 38 in the cylinder bore 32 or against the loading of the relatively heavy return spring 50. More forces accordingly are available for applying the brakes.

The mechanism is extremely simple, and all of the parts may be assembled in their entirety before being placed in position in the motor vehicle. The parts are assembled and the rod 23 is moved rearwardly through the opening in the fire wall 18, whereupon the previously applied boot 128 is adjusted in position and the rear end of the rod 123 is connected to the brake pedal.

The threaded plug 70 serves to support the spring seat for the spring 74 and acts to take up thrusts limiting movement of the valve 76 to normal off position. The various members 67, 71, 74, 76, 77 and 82 may be assembled relative to each other, whereupon the stem 71 may be pushed through the plug 70. The elements are inserted in position with the forward end of the stem 71 arranged in the bore 79, whereupon the plug 70 may be tightened in position. The elements of the motor may be assembled with equal ease. The piston 38 and the rods 39 and 41 may be assembled externally of the motor, whereupon the spring 50 will be placed in position relative to the parts referred to. The piston assembly then may be moved into the bore 32 from the left-hand end thereof, and the piston rod 39 may be slid through the bearing and sealing means 48. The cylinder head 34 is then moved in position relative to the stem 41 and is secured to the motor body 31. Accordingly, it will be apparent that the apparatus not only involves a minimum number of simple elements, but the assembly of these elements into an operative mechanism is greatly simplified and facilitated.

In operation, the apparatus has been found to provide highly advantageous results in spite of its simplicity. Initial pedal movement takes place solely against the spring 82, then against the initial stage of hydraulic reaction described above, followed by the second stage of hydraulic reaction. The second stage of reaction comes in very smoothly at the end of the first stage of reaction, such stage progressively increasing as the application of force to the valve 76 is increased, to tend to move such valve toward the seat member 67.

The operation which will take place upon the releasing of the brake pedal will be obvious from the foregoing. The releasing of the brake pedal releases forces applied to the valve mechanism, and accordingly the valve 76 will be promptly returned to the normal position shown in Figure 2 to re-establish the free circulation of hydraulic fluid through the system. When pressures are balanced in the two motor chambers, the return spring 50 will promptly return the piston 38 to its normal position.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster mechanism comprising a push rod, a hydraulic motor having a cylinder, a piston reciprocable in said cylinder, a piston rod connected to said piston and projecting axially from said motor, said piston dividing said cylinder to form a variable pressure chamber and a low pressure chamber, a valve housing having a first chamber communicating with said variable pressure chamber and having an inlet port for connection with a constantly operating pump, and a second chamber communicating with said low pressure chamber, a member dividing said first and second chambers and provided with an axial opening therethrough, a valve in said second chamber, a stem carrying said valve and projecting from said housing, means biasing said valve to a position away from said member for the free flow of hydraulic fluid from said first chamber to said second chamber and into said low pressure chamber, said low pressure chamber having a discharge port, pedal operable means, and lever means connected to said push rod, said pedal operable means, said stem and said piston rod whereby movement of said pedal operable means moves said valve toward closed position to throttle communication between said first and second chambers and build up pressure in said variable pressure chamber to operate said piston and transmit forces through said piston rod to said lever mechanism to said push rod.

2. A booster mechanism comprising a push rod, a hydraulic motor having a cylinder, a piston reciprocable in said cylinder, a piston rod connected to said piston and projecting axially from said motor, said piston dividing said cylinder to form a variable pressure chamber and a low pressure chamber, a valve housing having a first chamber communicating with said variable pressure chamber and having an inlet port for connection with a constantly operating pump, and a second chamber communicating with said low pressure chamber, a member dividing said first and second chambers and provided with an axial opening therethrough, a valve in said second chamber, a stem carrying said valve and projecting from said housing, means biasing said valve to a position away from said member for the free flow of hydraulic fluid from said first chamber to said second chamber and into said low pressure chamber, said low pressure chamber having a discharge port, a pedal operable rod, a first lever pivotally connected to said pedal operable rod and engaging said stem to move said valve toward said member to throttle communication between said first and second chambers to build up pressure in said variable pressure chamber and operate said piston, and a second lever supported on a fixed pivot axis and connected at one end with said push rod, the other end of said second lever having abutting engagement with said piston rod whereby movement of the latter turns said first lever when said motor is energized, said other end of said first lever being free to move away from said piston rod upon a failure of power for said motor, and means for transmitting force from said pedal operable rod through said first lever to said push rod.

3. A mechanism according to claim 2 wherein said means for transmitting force from said pedal operable rod to said push rod comprises a pivot pin pivotally connecting said first lever to said push rod.

4. A booster mechanism comprising a push rod, a hydraulic motor having a cylinder, a piston reciprocable in said cylinder, a piston rod connected to said piston and projecting axially from said motor, said piston dividing said cylinder to form a variable pressure chamber and a low pressure chamber, a valve housing having a first chamber communicating with said variable pressure chamber and having an inlet port for connection with a constantly operating pump, and a second chamber communicating with said low pressure chamber, a member dividing said first and second chambers and provided with an axial opening therethrough, a valve in said second chamber, a stem carrying said valve and projecting from said housing, means biasing said valve to a position away from said member for the free flow of hydraulic fluid from said first chamber to said second chamber and into said low pressure chamber, said low pressure chamber having a discharge port, a pedal operable rod, a first lever pivotally connected at one end to said push rod and having its other end engaging said stem, said pedal operable rod being pivotally connected to said first lever intermediate the ends thereof whereby movement of said pedal operable rod transmits force respectively from opposite ends of said lever to said push rod and to said valve to move the latter toward said member to throttle communication between said first and second chambers to build up pressure in said variable pressure chamber to operate said piston, and a second lever pivotally supported intermediate its ends for turning movement on a fixed axis, one end of said second lever being connected to said push rod and the other end of said second lever having abutting engagement with said piston rod whereby movement of the latter turns said second lever to transmit force to said push rod and whereby said other end of said second lever is free to move away from said piston rod upon a failure of power for said motor.

5. A mechanism according to claim 4 wherein said valve housing has a valve seat between said first and second chambers facing toward said second chamber, said member constituting a combined valve and seat member engaging said valve seat, and means biasing said member toward said valve seat whereby, when pressure in said first chamber increases to a predetermined point, said member will be moved from said valve seat and engage said valve to transmit hydraulic reaction forces to said other end of said first lever.

6. A booster mechanism comprising a push rod, a hydraulic motor having a cylinder provided with a pair of heads, a piston reciprocable in said cylinder, a piston rod connected to said piston and projecting axially therefrom through one of said heads, the other of said heads having a bore equal in diameter to said piston rod, an axial projection carried by said piston and slidable in said bore, said piston dividing said cylinder to form a variable pressure chamber and a low pressure chamber, a valve housing having a first chamber communicating with said variable pressure chamber and having an inlet port for connection with a constantly operating pump, and a second chamber communicating with said low pressure chamber, a member dividing said first and second chambers and provided with an axial opening therethrough, a valve in said second chamber, a stem carrying said valve and having one end projecting from said housing, means biasing said valve to a position away from said member for the free flow of hydraulic fluid from said first chamber to said second chamber and into said low pressure chamber, said low pressure chamber having a discharge port, pedal operable means, and lever means connected to said push rod, said pedal operable means, said stem and said piston rod whereby movement of said pedal operable means moves said valve toward closed position to throttle communication between said first and second chambers and build up pressure in said variable pressure chamber to operate said piston and transmit forces through said piston rod to said lever mechanism and to said push rod.

7. A mechanism according to claim 6 wherein said valve housing is provided with end walls, said stem projecting through one of said end walls in the same direction as said piston rod, the other end wall having a bore, said stem projecting through said valve and into said bore.

8. A mechanism according to claim 6 wherein said valve housing is provided with a valve seat facing toward said second chamber, said member constituting a combined valve and seat member normally engaging said valve seat, and a spring biasing said member toward said valve seat whereby, upon a predetermined increase in pressure in said first chamber, said member will be moved from said valve seat and against said valve to transmit hydraulic forces through said stem to said lever mechanism to oppose movement of said pedal operable means.

9. A mechanism according to claim 6 wherein said valve housing is provided with end walls, said stem having said one end projecting through one of said end walls in the same direction as said piston rod, the other end wall having a bore, the other end of said stem projecting through said valve and into said bore, said valve housing being provided with a valve seat facing toward said second chamber, said member constituting a combined valve and seat member normally engaging said valve seat and provided with an axial opening from which said valve is normally spaced for the flow of fluid from said first chamber to said second chamber, and a spring biasing said member toward said valve seat whereby, upon a predetermined increase in pressure in said first chamber, said member will be moved from said valve seat against said spring into engagement with said valve to transmit hydraulic forces through said one end of said stem to said lever mechanism to oppose movement of said pedal operable means.

10. A booster mechanism comprising a push rod, a hydraulic motor having a cylinder provided with a pair of heads, a piston reciprocable in said cylinder, a piston rod connected to said piston and projecting axially therefrom through one of said heads, the other of said heads having a bore equal in diameter to said piston rod, an axial projection carried by said piston and slidable in said bore, said piston dividing said cylinder to form a variable pressure chamber and a low pressure chamber, a valve housing having a first chamber communicating with said variable pressure chamber and having an inlet port for connection with a constantly operating pump, and a second chamber communicating with said low pressure chamber, a member dividing said first and second chambers and provided with an axial opening therethrough, a valve in said second chamber, a stem carrying said valve and having one end projecting from said housing, means biasing said valve to a position away from said member for the free flow of hydraulic fluid from said first chamber to said second chamber and into said low pressure chamber, said low pressure chamber having a discharge port, pedal operable means, a first lever pivotally connected intermediate its ends to said pedal operable means and connected at its respective ends to said push rod and said one end of said stem, and a second lever pivoted for turning movement intermediate its ends on a fixed axis, one end of said second lever being connected to said push rod and the other end of said second lever having abutting contact with said piston rod whereby movement of said valve toward said member throttles communication between said first and second chambers to build up pressure in said variable pressure chamber to move said piston and transmit force through said piston rod to said other end of said second lever, and whereby said other end of said second lever is movable freely away from said piston rod upon a failure of power for said motor.

11. A mechanism according to claim 10 wherein said valve housing is provided with end walls, said one end of said stem projecting through one of said end walls in the same direction as said piston rod, the other end wall having a bore, the other end of said stem projecting slidably into said bore.

12. A mechanism according to claim 10 wherein said valve housing is provided with a valve seat facing toward said second chamber, said member constituting a combined valve and seat member normally engaging said valve seat, and a spring biasing said member toward said valve seat whereby, upon a predetermined increase in pressure in said first chamber, said member will be moved from said valve seat against said spring into engagement with said valve to transmit hydraulic forces through said one end of said stem to said first-named lever to oppose movement of said pedal operable means.

References Cited in the file of this patent
UNITED STATES PATENTS

| | | |
|---|---|---|
| 2,229,247 | Kamenarovic | Jan. 21, 1941 |
| 2,241,374 | Alfieri | May 13, 1941 |
| 2,766,732 | Schultz | Oct. 16, 1956 |
| 2,775,957 | Anderson | Jan. 1, 1957 |

FOREIGN PATENTS

| | | |
|---|---|---|
| 830,004 | Germany | Jan. 31, 1952 |
| 365,717 | Great Britain | Jan. 28, 1932 |
| 640,542 | Great Britain | July 19, 1950 |